(12) United States Patent
Yezerets et al.

(10) Patent No.: US 8,783,017 B2
(45) Date of Patent: Jul. 22, 2014

(54) SYSTEM, METHOD, AND APPARATUS TO ENGAGE ALTERNATE REDUCTANT IN A $NO_x$ REDUCTION SYSTEM

(75) Inventors: Aleksey Yezerets, Columbus, IN (US); Zheng Liu, Knoxville, TN (US); Neal W. Currier, Columbus, IN (US); J. Stephen Wills, Columbus, IN (US)

(73) Assignee: Cummins Inc., Columbus, IN (US)

( * ) Notice: Subject to any disclaimer, the term of this patent is extended or adjusted under 35 U.S.C. 154(b) by 499 days.

(21) Appl. No.: 13/045,194

(22) Filed: Mar. 10, 2011

(65) Prior Publication Data
US 2012/0023905 A1 Feb. 2, 2012

Related U.S. Application Data

(60) Provisional application No. 61/312,902, filed on Mar. 11, 2010.

(51) Int. Cl.
*F01N 3/00* (2006.01)
(52) U.S. Cl.
USPC ............................................................ 60/286
(58) Field of Classification Search
USPC .................................... 60/274, 286, 295, 299
See application file for complete search history.

(56) References Cited

U.S. PATENT DOCUMENTS

| 6,202,407 | B1 | 3/2001 | Brusasco et al. |
| 6,314,722 | B1 | 11/2001 | Matros et al. |
| 6,662,553 | B2 | 12/2003 | Patchett et al. |
| 7,146,802 | B2 | 12/2006 | Lee |
| 2006/0062709 | A1 | 3/2006 | Cho et al. |
| 2008/0236142 | A1* | 10/2008 | Sloane ............................. 60/274 |
| 2009/0255236 | A1* | 10/2009 | Collier et al. ................... 60/297 |

FOREIGN PATENT DOCUMENTS

| DE | 102007046460 A1 * | 4/2009 | ................ F01N 3/20 |
| EP | 1 541 219 B1 | 11/2009 | |
| WO | WO 2007/018990 A2 | 2/2003 | |

* cited by examiner

*Primary Examiner* — Thomas Denion
*Assistant Examiner* — Matthew T Largi
(74) *Attorney, Agent, or Firm* — Krieg DeVault LLP

(57) ABSTRACT

An exhaust aftertreatment process including providing a selective catalytic reduction (SCR) catalyst disposed in an exhaust stream of an internal combustion engine; determining that a temperature of the exhaust stream is not within an $NH_3$ based SCR range; and providing an amount of unburned hydrocarbon (UHC) to the SCR catalyst in response to the temperature of the exhaust stream not being within an $NH_3$ based SCR range.

21 Claims, 4 Drawing Sheets

SYSTEM, METHOD, AND APPARATUS TO ENGAGE ALTERNATE REDUCTANT IN A $NO_x$ REDUCTION SYSTEM

RELATED APPLICATIONS

This application is related to, and claims the benefit of, U.S. Provisional Application No. 61/312,902 filed on Mar. 11, 2010 which is incorporated herein by reference for all purposes.

BACKGROUND

The present application generally relates to exhaust aftertreatment systems, and more particularly, but not exclusively, to selective catalytic reduction ("SCR") systems. Presently available SCR systems adsorb ammonia ($NH_3$) on a catalyst and then react the $NH_3$ with $NO_x$ to reduce the $NO_x$ emissions. The $NH_3$ is typically stored as a less reactive composition, e.g. urea, and hydrolyzed into $NH_3$ in the exhaust system as required to reduce the $NO_x$ emitted by the engine. At certain system operating conditions, the $NH_3$-based $NO_x$ reduction mechanism breaks down due to lack of $NH_3$ storage capacity on the SCR catalyst, due to an inability to rapidly hydrolyze urea into $NH_3$, or for other reasons. When the $NH_3$-based $NO_x$ reduction mechanism breaks down, the net $NO_x$ emissions of the system increase.

SUMMARY

One embodiment is a unique method to engage an alternate reductant in a $NO_x$ reduction system. Further embodiments, forms, objects, features, advantages, aspects, and benefits shall become apparent from the following description and drawings.

DESCRIPTION OF THE ILLUSTRATIVE EMBODIMENTS

Figure 1:
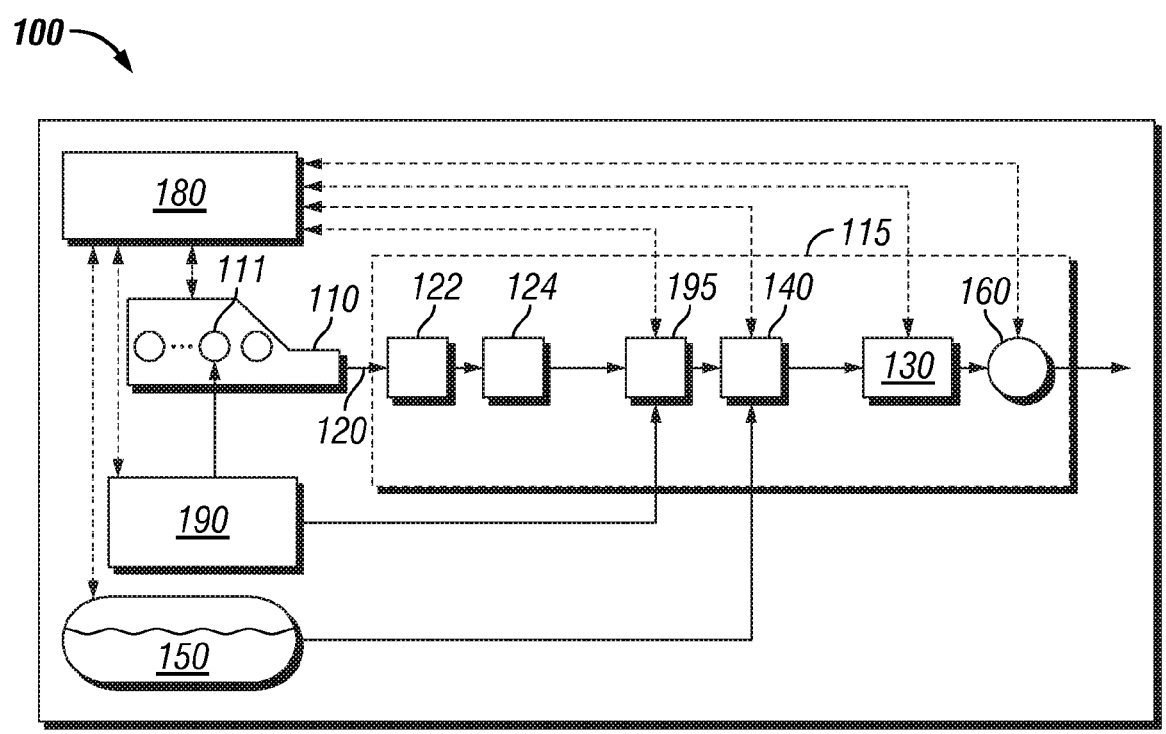
FIG. 1 is a schematic illustration of a system including an exemplary SCR system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1, there is illustrated a system 100 including an engine 110 which is configured to provide rotating mechanical power to system 100 and to output exhaust to an exhaust flow path 120. System 100 is illustrated schematically and may be a car, truck, bus, boat, recreational vehicle, construction equipment or another type of vehicle. Other embodiments include an engine provided in non-vehicular applications such as a generator set. The exhaust output by engine 110 includes $NO_x$ which is to be reduced using an exhaust aftertreatment system 115.

In one embodiment, exhaust aftertreatment system 115 may include an oxidation catalyst 122 which is in fluid communication with exhaust flow path 120 and is operable to catalyze oxidation of one or more compounds in exhaust flowing through exhaust flow path 120, for example, oxidation of unburned hydrocarbons or oxidation of NO to $NO_2$. In another embodiment, exhaust aftertreatment system 115 may further include a diesel particulate filter 124 in fluid communication with exhaust flow path 120 and operable to reduce the level of particulates in exhaust flowing through exhaust flow path 120. In an exemplary embodiment diesel particulate filter 124 is a catalyzed soot filter. Other embodiments utilize other types of diesel particulate filters.

Exhaust aftertreatment system 115 may include a reductant injector 140 and an SCR catalyst 130. Reductant injector 140 is supplied with reductant from a reductant reservoir 150 and is operable to inject reductant into exhaust flow path 120. In an exemplary embodiment the reductant is an aqueous solution of urea which decomposes to provide ammonia. Other embodiments utilize different reductants, for example, aqueous solutions of ammonia, anhydrous ammonia, or other reductants suitable for SCR. Reductant injected into exhaust flow path 120 is provided to SCR catalyst 130 which is in flow communication with exhaust flow path 120 and is operable to catalyze the reduction of $NO_x$. In certain embodiments, the SCR catalyst 130 includes a zeolite based catalyst, but any type of SCR catalyst known in the art is contemplated herein.

Figure 2A:
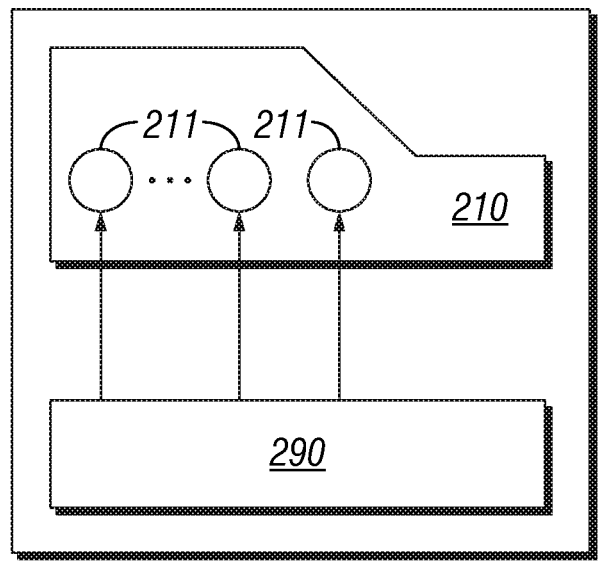
FIGS. 2a and 2b are schematic illustrations of subsystem included in an exemplary SCR system.
Figure 2B:
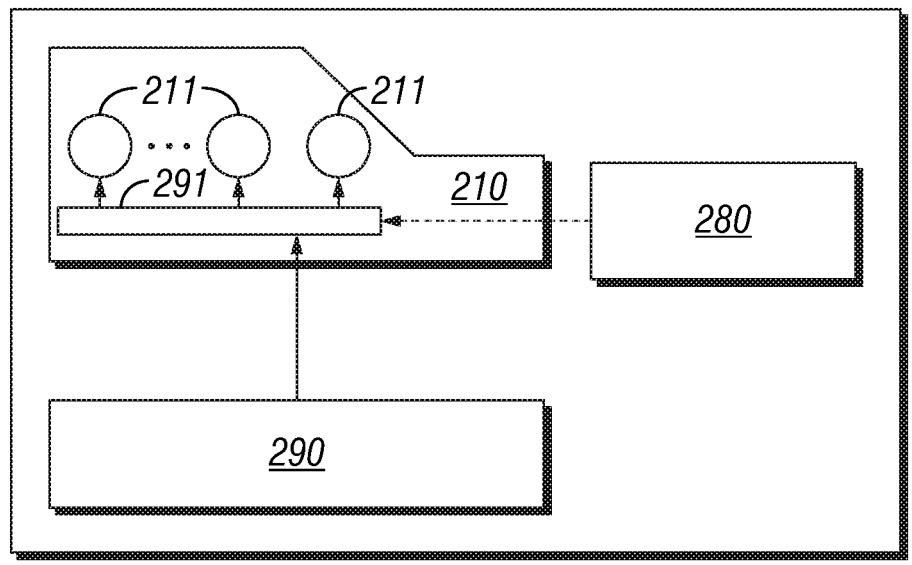

Exhaust aftertreatment system 115 further includes a hydrocarbon (HC) injector 195 which is supplied with HC from an HC reservoir 190 and is operationally coupled to the exhaust stream at a position upstream of SCR catalyst 130. Other embodiments of a system 200a and 200b are shown in FIGS. 2a and 2b, respectively. System 200b may include an engine 210 having a common rail fuel system 291 capable of injecting a very late post injection fuel where at least a portion of the very late post injection fuel does not combust in at least one cylinder 211 of engine 210 and where common rail fuel system 291 is responsive to a HC addition command from a controller 280. System 200a is shown including an engine 210 with at least one cylinder 211. Fuel from a fuel reservoir 290 is provided to each of the at least one cylinders 211 with a fuel injection system. An exemplary fuel injection system is a common rail direct injection system. A reservoir 290 that serves as the source for HC addition may also supply the fuel for engine operation or reservoir 290 may be an additional source of HC.

Exhaust flow path 120, as illustrated schematically in FIG. 1, may be provided in a variety of physical configurations. In an exemplary embodiment an exhaust flow path proceeds from the output of a turbocharger (not shown) of an engine 110 through a conduit to a structure containing an oxidation catalyst 122 and a diesel particulate filter 124, through a second conduit to a structure containing an SCR catalyst 130 and through another conduit which outlets to the ambient environment. This embodiment may also include an ammonia oxidation AMOX catalyst (not shown) at a position downstream of the SCR catalyst 130, which is operable to catalyze the reaction of $NH_3$ which slips past the SCR catalyst 130.

Referring back to system 100 in FIG. 1, in certain embodiments, system 100 includes a controller 180 which functionally executes certain operations for engaging an alternate reductant in a $NO_x$ reduction system. Controller 180 forms a portion of a processing subsystem including one or more computing devices having memory as well as a number of inputs and outputs for interfacing with various sensors and systems of system 100. Controller 180 can be an electronic circuit comprised of one or more components, including digital circuitry, analog circuitry, or both. Controller 180 may be a single device or a distributed device. Controller 180 may include one or more control algorithms defined by operating logic in the form of software instructions, hardware instructions, firmware instructions, dedicated hardware, or the like.

In one form, controller 180 is of a programmable microcontroller solid-state integrated circuit type that includes memory and one or more central processing units. The memory of controller 180 includes of one or more components and can be of any of volatile or nonvolatile, solid-state, optical media, magnetic media, combinations of these, or other types of memory. Controller 180 can include signal conditioners, signal format converters (such as analog-to-digital and digital-to-analog converters), limiters, clamps, filters, and the like as needed to perform various control and regulation operations described herein. Controller 180, in an exemplary embodiment, may be a type of controller sometimes referred to as an electronic or engine control module (ECM), electronic or engine control unit (ECU) or the like, that is directed to the regulation and control of engine operation. Alternatively, controller 180 may be dedicated to the control of just the operations described herein or to a subset of controlled aspects of system 100.

Controller 180 is in operative communication with a temperature sensor 160 which provides controller 180 with information indicative of the temperature of the exhaust system. In other embodiments, information from temperature sensors in various locations is utilized to determine information indicative of the temperature of SCR catalyst 130. The location of the temperature sensor 160 is exemplary and non-limiting. A temperature sensor 160 may be positioned within the SCR catalyst 130, upstream of the SCR catalyst 130, and/or multiple temperature sensors 160 may be present with an average or weighted average of sensors utilized to determine the temperature of the exhaust system and/or SCR catalyst 130.

Controller 180 may determine if a temperature of the exhaust stream is not within an ammonia based SCR range and, in response, provide an unburned hydrocarbon (UHC) addition command where UHC is added to exhaust aftertreatment system 115. UHC addition may be performed by injecting an amount of fuel in a cylinder 111 of engine 110 at a very late timing such that the injected amount of fuel does not combust in cylinder 111. The source of UHC may be a fuel already a part of system 100. Alternatively or additionally, the system 100 includes an HC injector 195 where HC injector 195 is responsive to a UHC addition command from controller 180 injecting an amount of UHC into exhaust flow path 120. The HC injector 195 is illustrated at a position downstream of the diesel particulate filter 124, but may be positioned anywhere in the exhaust aftertreatment system 115 upstream of the SCR catalyst 130.

In certain embodiments, the controller 180 includes one or more modules structured to functionally execute the operations of the controller 180. The description herein including modules emphasizes the structural independence of the aspects of the controller, and illustrates one grouping of operations and responsibilities of the controller 180. Other groupings that execute similar overall operations are understood within the scope of the present application. Modules may be implemented in hardware and/or software on computer readable medium, and modules may be distributed across various hardware or software components.

Controller 180 is in operative interconnection with various elements of system 100 as illustrated in FIG. 1 with dashed lines extending between controller 180 and various elements of system 100. These operative interconnections may be implemented in a variety of forms, for example, through input/output interfaces coupled via wiring harnesses, a datalink, a hardwire or wireless network and/or a lookup from a memory location. In other instances all or a portion of the operative interconnection between controller 180 and an element of system 100 may be virtual. For example, a virtual input indicative of an operating parameter may be provided by a model implemented by controller 180 or by another controller which models an operating parameter based upon other information.

Figure 4:
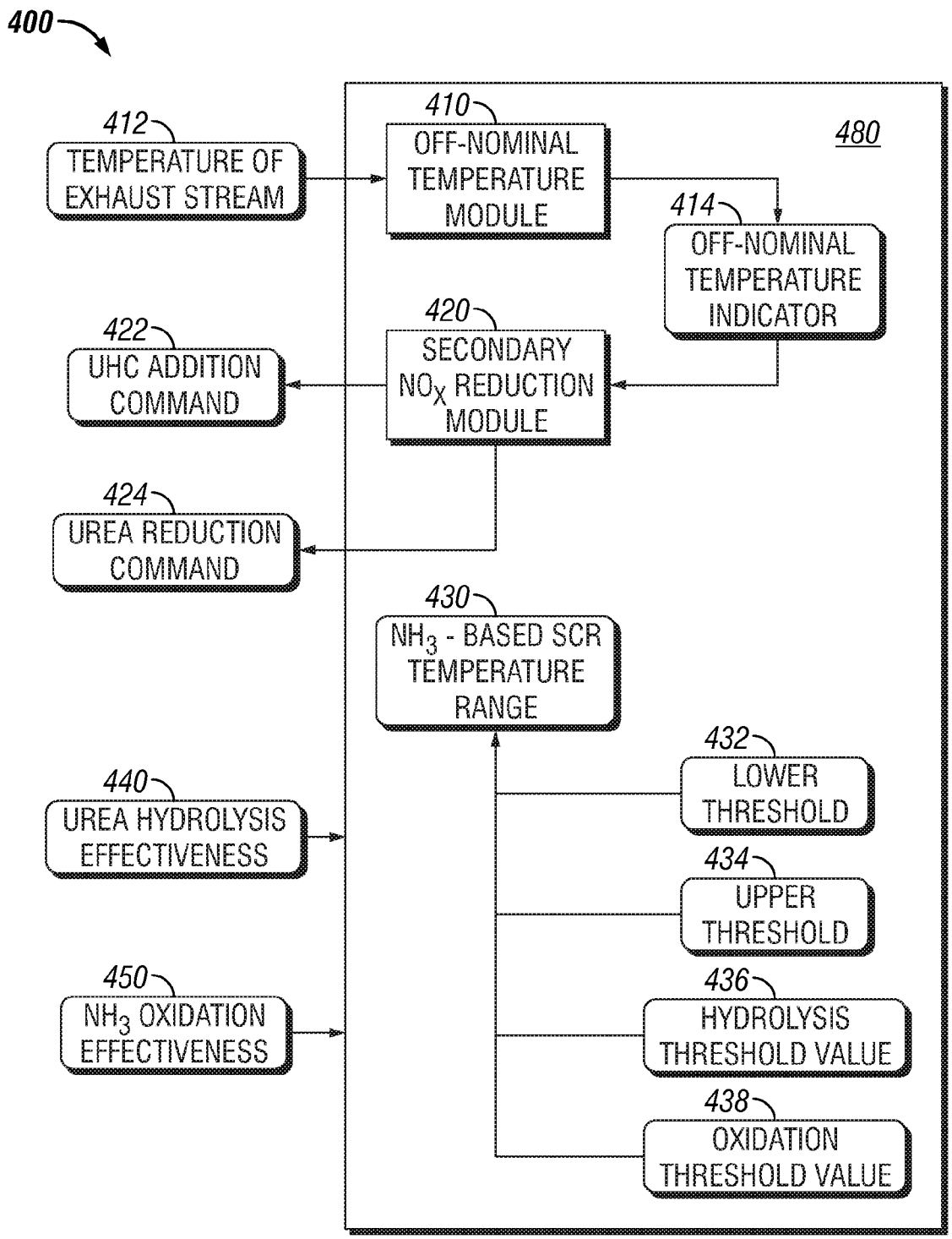
FIG. 4 is a diagram illustrating an exemplary control operation for an SCR procedure.

Another embodiment as shown in FIG. 4 represents an apparatus 400 that includes a controller 480 with various components illustrated as representative modules, inputs, outputs, and intermediate data parameters. Module 410 is an off-nominal temperature module 410 structured to determine an off-nominal temperature indicator 414 in response to determining that a temperature of the exhaust stream 412 received by off-nominal temperature module 410 is not within an ammonia based selective catalytic reduction (SCR) temperature range 430. Module 420 is a secondary $NO_x$ reduction module 420 structured to provide an unburned hydrocarbon (UHC) addition command 422 in response to the off-nominal temperature indicator 414. A fuel injector, common rail fuel system, and/or reductant injector is responsive to the UHC addition command 422 to add UHC to the exhaust aftertreatment system 115. The secondary $NO_x$ reduction module 420 may be further structured to provide a urea reduction command 424 for the SCR catalyst in response to the UHC addition command 422. For example, less urea may be used due to the reactions taking place with the injected UHC.

The reactions that take place in an ammonia based SCR system are in part temperature dependent. An effective temperature range for an ammonia based SCR system depends on the various fuels, gas constituents, $NO:NO_2$ ratio, catalyst composition and catalyst geometry of the system. Operating outside of the temperature range for these reactions may reduce efficiency of any one or multiple reactions thereby reducing the efficiency of the system. A less efficient system may result in an unacceptable level of various components in the exhaust. Because HC-based systems are capable of operating outside the ammonia based SCR system temperature range 430, there are certain situations in which a temperature is present where the hydrolysis efficiency of urea to ammonia is too low, or where the oxidation rate of ammonia is too high. An ammonia based SCR system may therefore be unable to maintain an adequate $NO_x$ reduction rate and the HC based reduction system may provide some $NO_x$ conversion that reduces the emissions impact on the system of temperature excursions outside the ammonia based SCR system temperature range 430.

In certain embodiments, the ammonia based SCR range 430 may be established by one of the following options: (1) determining the temperature of the exhaust stream is below a lower threshold 432 such as 200° C.; (2) determining the temperature of the exhaust stream is above an upper threshold 434 such 250° C., 300° C., or 400° C.; (3) determining that a urea hydrolysis effectiveness 440 is below a hydrolysis threshold value 436; or (4) determining that an ammonia oxidation effectiveness 450 is greater than an oxidation threshold value 438. While the $NH_3$-based SCR temperature may be less efficient below about 200° C. and HC-based SCR conversion may be implemented to reduce $NO_x$ emissions, HC-based SCR conversion has a lower limit of about 150° C. depending upon the conditions in the exhaust and the composition of the fuel in the reservoir 190. The determination of a temperature range wherein HC supplementation or replacement of urea as a reductant is readily determined by one of skill in the art having the benefit of the disclosure herein by straightforward empirical testing of the system at a few operating conditions.

The determination of specific range values depends upon system factors that are known to those of skill in the art contemplating a particular system. For example, the upper bound temperature depends upon the oxidation rate of ammonia for the particular SCR catalyst 130, the effect of elevated temperatures on the ammonia-based $NO_x$ conversion rates for the particular catalyst formulation and physical geometry, the achievable UHC-based $NO_x$ conversion rates for the particular catalyst formulation and physical geometry, the acceptable lower end of $NO_x$ reduction for the temperature, the availability of any $NO_x$-mitigation techniques at elevated temperatures (e.g. higher EGR flow rates or other $NO_x$-mitigation techniques understood in the art), the percentage of the expected application duty cycle that will experience the elevated temperatures, and the available $NO_x$ emission rates at other system operating conditions that allow elevated $NO_x$ emissions rates at higher temperatures to be averaged in with the other system operating conditions. The balancing of the various system impacts by utilizing an alternate reductant outside of the ammonia based SCR range 430, including at least emissions, fuel consumption, relative costs of the reductant choices, and operator satisfaction impacts, is a mechanical step for one of skill in the art having the benefit of the disclosures herein.

The schematic flow diagram and related description which follows provides an illustrative embodiment of performing procedures for engaging an alternate reductant in a $NO_x$ reduction system. Operations illustrated are understood to be exemplary only, and operations may be combined or divided, and added or removed, as well as re-ordered in whole or part. Certain operations illustrated may be implemented by a computer executing a computer program product on a computer readable medium, where the computer program product comprises instructions causing the computer to execute one or more of the operations, or to issue commands to other devices to execute one or more of the operations.

Figure 3:
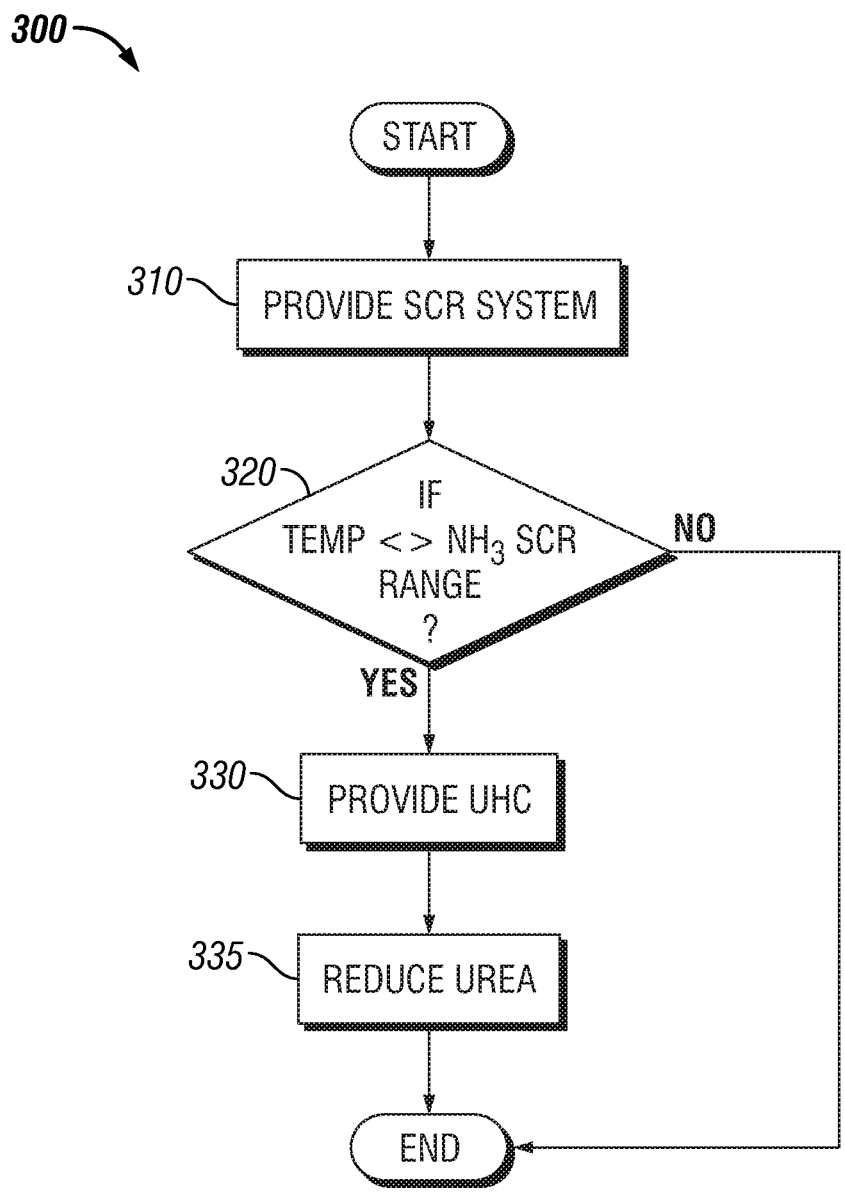
FIG. 3 is a flow diagram of a procedure that can be performed with an SCR system.

Referencing FIG. 3, a process 300 includes an operation 310 to provide a selective catalytic reduction (SCR) catalyst as part of an exhaust stream of an engine. The process 300 further includes conditional 320 to determine if a temperature of the exhaust stream is outside of an ammonia based SCR range. The effectiveness of ammonia based SCR systems depends on the process of urea hydrolysis and ammonia adsorption to the SCR catalyst. Both of these processes are temperature dependent. In low temperature conditions, the ammonia based SCR systems are unable to keep up with the engine out production of $NO_x$ and the ammonia based SCR systems become inefficient.

Ammonia based SCR systems are also subject to reduced efficiencies at high temperatures. The ammonia necessary for $NO_x$ reduction is susceptible to oxidation. The rate of ammonia oxidation increases as the temperature increases. Ammonia that has oxidized is unavailable to reduce $NO_x$ in the exhaust stream. As the temperature rises beyond an ammonia oxidation threshold, the ammonia oxidation effectiveness increases and the ammonia reduction of $NO_x$ effectiveness decreases. Determining if the temperature of the exhaust stream is not within the ammonia based SCR range may include one of the following options: determining the temperature of the exhaust stream is below 200° C.; determining the temperature of the exhaust stream is above 250° C.; determining the temperature of the exhaust stream is above 300° C.; determining the temperature of the exhaust stream is above 400° C.; determining that a urea hydrolysis effectiveness due to the temperature is below a hydrolysis threshold value; or determining that an ammonia oxidation effectiveness due to the temperature is greater than an oxidation threshold value.

A urea hydrolysis effectiveness and hydrolysis threshold value may be determined for a number of reasons which may include a nominal operation requirement for the pollutant reduction system, a level of emissions control required at the present operating conditions, a level of hydrolysis required for efficient operation of the pollutant reduction system, a level of hydrolysis required for diagnostic reasons, and/or any combination of these. An ammonia oxidation effectiveness and oxidation threshold value may be determined to monitor the release of unreacted ammonia into the exhaust stream. These thresholds may be established according to catalyst temperature, exhaust gas temperature, $NH_3$ and/or $O_2$ concentration, the presence or lack of an $NH_3$ oxidation catalyst downstream of the SCR catalyst, and/or the conversion rate of the $NH_3$ oxidation catalyst at present operating conditions. These values may be set values in a look up table and/or may be determined by a calculation with retrieved variables.

In response to conditional 320 returning a YES (i.e. the temperature is not within the $NH_3$ SCR range for one or more reasons), the process 300 includes an operation 330 to provide an amount of unburned hydrocarbon (UHC) to the SCR catalyst. The HC-based $NO_x$ conversion reaction proceeds at temperatures outside the $NH_3$-based SCR temperature range, both at higher temperatures and lower temperatures than $NH_3$-based SCR. Operation 330 may, when providing an amount of unburned hydrocarbon (UHC) to the SCR catalyst, include performing a UHC addition operation such as injecting an amount of fuel into a cylinder of the engine at a very late timing such that the injected amount of fuel does not fully combust in the cylinder or injecting an amount of fuel directly into the exhaust stream. The exemplary procedure 300 further includes an operation 335 to reduce an amount of injected urea into the exhaust stream in response to providing an amount of unburned hydrocarbon (UHC) to the SCR catalyst. The operation 330 to provide UHC to the exhaust gas may fully or partially replace some of the urea that would otherwise be injected into the exhaust gas.

As is evident from the figures and text presented above, a variety of embodiments according to the present invention are contemplated.

One embodiment is a method, including: (1) providing a selective catalytic reduction (SCR) catalyst disposed in an exhaust stream of an internal combustion engine; (2) determining that a temperature of the exhaust stream is not within an ammonia based SCR range; and (3) providing an amount of unburned hydrocarbon (UHC) to the SCR catalyst in response to the temperature of the exhaust stream not being within an ammonia based SCR range. This embodiment may also include reducing an amount of injected urea into the exhaust stream in response to providing an amount of unburned hydrocarbon (UHC) to the SCR catalyst.

As a further feature, determining that the temperature of the exhaust stream is not within the ammonia based SCR range may include: determining the temperature of the exhaust stream is below 200° C.; determining the temperature of the exhaust stream is above 250° C.; determining the temperature of the exhaust stream is above 300° C.; determining the temperature of the exhaust stream is above 400° C.; determining that a urea hydrolysis effectiveness is below a hydrolysis threshold value; or determining that an ammonia oxidation effectiveness is greater than an oxidation threshold value.

Another feature of this embodiment may, when providing an amount of unburned hydrocarbon (UHC) to the SCR catalyst, include performing a UHC addition operation such as injecting an amount of fuel into a cylinder of the engine at a very late timing such that the injected amount of fuel does not combust in the cylinder or injecting an amount of fuel directly into the exhaust stream.

Another embodiment includes a system with a selective catalytic reduction (SCR) catalyst disposed in an exhaust stream of an internal combustion engine; a controller structured to determine that a temperature of the exhaust stream is not within an ammonia based SCR range and provide an unburned hydrocarbon (UHC) addition command for the SCR catalyst in response to the determining. This embodiment may further include a fuel injector operationally coupled to the exhaust stream at a position upstream of the SCR catalyst, wherein the fuel injector is responsive to the UHC addition command.

The controller of this embodiment may be further structured to determine that a temperature of the exhaust stream is not within the ammonia based SCR range by determining that a urea hydrolysis effectiveness is below a hydrolysis threshold value or determining that an ammonia oxidation effectiveness is greater than an oxidation threshold value.

Further features of this embodiment may include the engine having a common rail fuel system capable of injecting a very late post injection fuel where the very late post injection fuel does not combust in a cylinder of the engine and where the common rail fuel system is responsive to the UHC addition command. The SCR catalyst may also include a zeolite based catalyst.

Still another embodiment includes an apparatus with a selective catalytic reduction (SCR) catalyst disposed in an exhaust stream of an engine; an off-nominal temperature module structured to determine an off nominal temperature indicator in response to determining that a temperature of the exhaust stream is not within an ammonia based SCR range; and a secondary $NO_x$ reduction module structured to provide an unburned hydrocarbon (UHC) addition command for the SCR catalyst in response to the off nominal temperature indicator. The secondary $NO_x$ reduction module may be further structured to provide a urea reduction command for the SCR catalyst in response to the UHC addition command.

As a further feature, the off-nominal temperature module, when determining that the temperature of the exhaust stream is not within the ammonia based SCR range, may include: determining the temperature of the exhaust stream is below 200° C.; determining the temperature of the exhaust stream is above 250° C.; determining the temperature of the exhaust stream is above 300° C.; determining the temperature of the exhaust stream is above 400° C.; determining that a urea hydrolysis effectiveness is below a hydrolysis threshold value; or determining that an ammonia oxidation effectiveness is greater than an oxidation threshold value.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   providing a selective catalytic reduction (SCR) catalyst disposed in an exhaust stream of an internal combustion engine;
   determining that a temperature of the exhaust stream is not within an ammonia (NH3) based SCR range when the temperature of the exhaust stream is below a lower temperature threshold and when the temperature of the exhaust stream is above an upper temperature threshold; and
   providing an amount of unburned hydrocarbon (UHC) to the SCR catalyst in response to determining the temperature of the exhaust stream is not within the ammonia (NH3)based SCR range while reducing an amount of urea injected into the exhaust stream in response to the amount of UHC provided.

2. The method of claim 1, wherein the lower temperature threshold is below 200° C.

3. The method of claim 1, wherein the upper temperature threshold is above 250° C.

4. The method of claim 1, wherein the upper temperature threshold is above 300° C.

5. The method of claim 1, wherein the upper temperature threshold is above 400° C.

6. The method of claim 1, wherein determining that the temperature of the exhaust stream is not within the NH3 based SCR range comprises determining that a urea hydrolysis effectiveness is below a hydrolysis threshold value.

7. The method of claim 1, wherein determining that the temperature of the exhaust stream is not within the NH3 based SCR range comprises determining that an NH3 oxidation effectiveness is greater than an oxidation threshold value.

8. The method of claim 1, wherein providing an amount of unburned hydrocarbon (UHC) to the SCR catalyst comprises performing a UHC addition operation selected from the operations:
   injecting an amount of fuel into a cylinder of the engine at a very late timing such that the injected amount of fuel does not combust in the cylinder; and
   injecting an amount of fuel directly into the exhaust stream.

9. A system, comprising:
   a selective catalytic reduction (SCR) catalyst disposed in an exhaust stream of an internal combustion engine; and
   a controller structured to:
   determine that a temperature of the exhaust stream is not within an ammonia (NH3) based SCR range in response to the temperature of the exhaust stream being below a lower temperature threshold and in response to the temperature of the exhaust stream being above an upper temperature threshold; and
   provide an unburned hydrocarbon (UHC) addition command for the SCR catalyst in response to determining the temperature of the exhaust stream is not within the NH3 based SCR range while reducing an amount of urea injected into the exhaust stream in response to the amount of UHC provided.

10. The system of claim 9, wherein the controller is further structured to determine that a temperature of the exhaust stream is not within the NH3 based SCR range by determining that a urea hydrolysis effectiveness is below a hydrolysis threshold value.

11. The system of claim 9, wherein the controller is further structured to determine that a temperature of the exhaust stream is not within the NH3 based SCR range by determining that an NH3 oxidation effectiveness is greater than an oxidation threshold value.

12. The system of claim 9, further comprising a fuel injector operationally coupled to the exhaust stream at a position upstream of the SCR catalyst, wherein the fuel injector is responsive to the UHC addition command.

13. The system of claim 9, wherein the engine comprises a common rail fuel system capable of injecting a very late post injection fuel, wherein the very late post injection fuel does not combust in a cylinder of the engine, and wherein the common rail fuel system is responsive to the UHC addition command.

14. The system of claim 9, wherein the SCR catalyst comprises a zeolite based catalyst.

15. An apparatus, comprising:
   a selective catalytic reduction (SCR) catalyst disposed in an exhaust stream of an engine;
   an off-nominal temperature module structured to determine an off nominal temperature indicator in response to determining that a temperature of the exhaust stream is not within an ammonia (NH3) based selective catalytic reduction (SCR) range when the temperature of the exhaust stream is below a lower temperature threshold and when the temperature of the exhaust stream is above an upper temperature threshold; and
   a secondary NOx reduction module structured to provide an unburned hydrocarbon (UHC) addition command for the SCR catalyst in response to the off nominal temperature indicator and to provide a urea reduction command for the SCR catalyst in response to the UHC addition command.

16. The apparatus of claim 15, wherein the lower temperature threshold is below 200° C.

17. The apparatus of claim 15, wherein the upper temperature threshold is above 250° C.

18. The apparatus of claim 15, wherein the upper temperature threshold is above 300° C.

19. The apparatus of claim 15, wherein the upper temperature threshold is above 400° C.

20. The apparatus of claim 15, wherein the off-nominal temperature module is further structured to determine that the temperature of the exhaust stream is not within the NH3 based SCR range by determining that a urea hydrolysis effectiveness is below a hydrolysis threshold value.

21. The apparatus of claim 15, wherein the off-nominal temperature module is further structured to determine that the temperature of the exhaust stream is not within the NH3 based SCR range by determining that an NH3 oxidation effectiveness is greater than an oxidation threshold value.

* * * * *